United States Patent [19]

Borne

[11] Patent Number: 5,278,387
[45] Date of Patent: Jan. 11, 1994

[54] GUN FOR CUTTING OUT SHEET METAL

[75] Inventor: André Borne, Bessancourt, France

[73] Assignee: La Soudure Autogene Francaise, Paris, France

[21] Appl. No.: 855,888

[22] Filed: Mar. 23, 1992

[30] Foreign Application Priority Data

Mar. 22, 1991 [FR] France .................. 91 03495

[51] Int. Cl.⁵ ........................................ B23K 10/00
[52] U.S. Cl. ........................ 219/121.39; 219/121.48; 219/121.5; 219/75
[58] Field of Search .................. 219/121.39, 121.44, 219/121.59, 121.48, 121.5, 121.52, 74, 75

[56] References Cited

U.S. PATENT DOCUMENTS

| | | | |
|---|---|---|---|
| 4,423,304 | 12/1983 | Bass et al. | 219/121.48 |
| 4,590,354 | 5/1986 | Marhic | 219/121.39 |
| 4,777,342 | 10/1988 | Hafner | 219/121.39 |
| 4,843,208 | 6/1989 | French et al. | 219/121.39 |
| 4,970,364 | 11/1990 | Muller | 219/121.47 |

FOREIGN PATENT DOCUMENTS 0369349 5/1990 European Pat. Off. .
3612722 10/1987 Fed. Rep. of Germany .
8716041 5/1988 Fed. Rep. of Germany .

*Primary Examiner*—Mark H. Paschall
*Attorney, Agent, or Firm*—Young & Thompson

[57] ABSTRACT

Gun for cutting out sheet metal, of the type comprising an electrode (26) within a nozzle (19) with an outlet conduit (23) for a plasmagenic gas, mounted for free axial displacement relative to an electrode carrier (14), characterized by a drive shaft (7) for the rotation of the electrode carrier (14) and of the nozzle (19) about an external axial bearing pivot (22) of the nozzle and an outlet conduit (23) for plasmagenic gas which is eccentric relative to said axial pivot (22).

This gun permits carrying out small cutouts of sheet metal by rotation of a plasma arc issuing from the conduit (25) rotating about the pivot (22).

Application particularly to unbuttoning spot welded sheets.

9 Claims, 1 Drawing Sheet

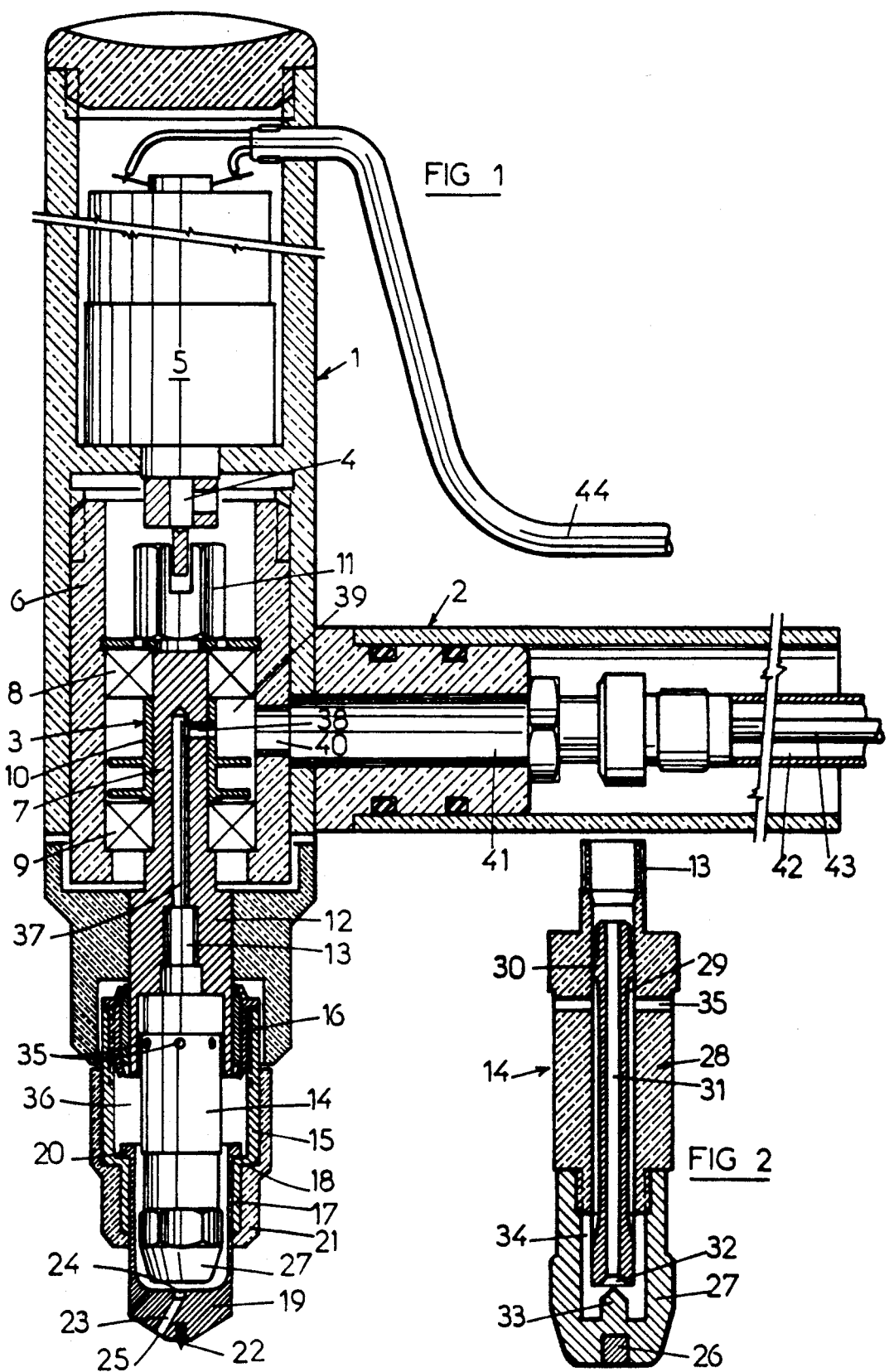

GUN FOR CUTTING OUT SHEET METAL

BACKGROUND OF THE INVENTION

The present invention relates to a gun for cutting out sheet metal, of the type comprising a body having an axis and supporting coaxially, at one end, a cutting head comprising an electrode-carrying assembly extending into a nozzle comprising a plasmagenic gas outlet, for cutting out circles of sheet metal, particularly for the formation of small cutouts about spot welds between two pieces of sheet metal, so as to separate them. This operation, which is commonly called "unbuttoning" of spot welded metal sheets is at present effected mechanically:

by hammer and chisel;
by grinding;
by a special cutting tool mounted on a drill.

None of these means permits performing properly and rapidly this type of operation, particularly for automobile repair or if access to the welds is limited.

In the first case, manual cutting out is difficult and imprecise and gives rise to deformations in the piece that one would like to reuse. Grinding, although neater, is a long and delicate operation, because the tool used is bulky. Cutting out requires a costly tool, whose use is delicate and which moreover gives rise to deformations of the support sheet metal.

SUMMARY OF THE INVENTION

The invention has arisen from the observation that the process of plasma cutting by compressed air or other gas has shown for several years its advantages in the field of cutting thin or medium thickness sheet metal, and the invention accordingly provides means for implementing the use of a plasma process which permits cutting the upper sheet of a spot welded assembly without substantially attacking the sheet metal support, the upper sheet being adapted to be bare (without protection) or painted, which is the case with automotive sheet metal, and has for its object a portable tool, light in weight and easy to handle, convenient to use, using no energy source other than those available in small shops (pneumatic or electric), and which is constituted of simple and inexpensive wear members.

To carry this out, according to the invention, the gun comprises, in the body, means for driving in rotation the cutting head about the axis, the outlet being eccentric relative to the axis.

Thus, when using an installation of the plasma cutting type, which is comprised by a generally adjustable current generator, in which are located the plasma cutting control housing, a supply tube which conducts the fluids necessary for the operation, compressed air or other gas, as well as the electric current, there is provided a tool comprised by a torch body and wear members assembled in the form of a cartridge.

There is thus reused in its entirety the generator and the feed tube, and it is as to the cutting tool that the invention is novel.

According to the invention, a torch body is used with a member permitting imparting to the cutting head a uniform movement of rotation, whose speed can be adjusted according to the thickness of the sheet metal to be cut out; a trigger located below the handle permits selecting the time to begin and end rotation.

In an automatic embodiment of the tool, the beginning and end of the cutting cycle, and hence the rotation, are controlled by the detection of striking and extinguishing the arc.

The supply to the member permitting imparting to the cutting head a uniform movement of rotation could be pneumatic, hydraulic, or electric.

The nozzle which surrounds the electrode-carrying cartridge has been arranged such that the plasma cutting arc exits in a direction at an angle to the pivot axis, such that the nozzle will describe with the arc a truncated cone which determines the diameter to be cut out, variable according to the angle of the plasmagenic gas content relative to the pivot.

The end of the nozzle is thus provided with a conductive element of high hardness serving as the centering pivot and permitting the passage of electric current for striking.

The intensity of cutting being variable, there corresponds to each level of intensity a selected nozzle diameter.

According to a preferred embodiment, the gun comprises an electrode carrier in the form of a cartridge secured to the end of a rotatable shaft by a tubular finger for locking in rotation, communicating upstream with a plasmagenic gas supply conduit comprising an axial shaft bore and a radial shaft bore, and downstream with a conduit extending axially to the vicinity of the electrode carrier and, also preferably, the nozzle is mounted for axial displacement for locking-unlocking in a casing integral with the drive shaft.

BRIEF DESCRIPTION OF THE DRAWINGS

Other characteristics and advantages of the invention will appear from the description which follows by way of example with reference to the accompanying drawings, in which:

FIG. 1 is a cross sectional view of an embodiment of a circular cutout gun according to the invention; and FIG. 2 is an enlarged cross section of the electrode-carrying assembly.

DETAILED DESCRIPTION OF THE INVENTION

Referring to the accompanying drawings, a circular cutout gun for sheet metal comprises, in a body of the gun 1 provided with a handle 2, a coaxial movable assembly 3 driven in rotation by an output shaft 4 of an electric motor 5 disposed in the body 1.

The movable assembly 3, which is mounted in a tubular sleeve 6, comprises essentially a rotatable shaft 7 carried by two roller bearings 8 and 9 spaced apart by a spacer 10 secured to the shaft 7.

This shaft 7 is connected by a coupling head 11 with the motor shaft 4 and its other end, enlarged at 12, is coupled with a tubular finger 13 for locking in rotation with an electrode-carrying cartridge 14 disposed in a casing 15 screwed on a screw-threaded annular insert 16 secured on the end 12 of shaft 7. This annular insert 16 is electrically insulated from the end 12.

The free end 17 of the casing 15 has a smaller diameter forming an axial retention shoulder 18 for a tubular metallic nozzle 19 mounted freely slidably, with the provision that, when the nozzle 19 is spaced axially from the electrode carrier 14, a small nozzle collar 20 will come into contact with the shoulder 18 under the force of the gaseous pressure (for example of the order of $6 \times 10^5$ Pa), such that the nozzle will thus be locked in rotation with the casing 17. A set screw 21 ensures the mounting of the assembly of the cutting head.

The nozzle 19 carries an external axial pivot 22 with a pointed end and an eccentric conduit 23 whose upstream end forms an axial recess 24 and whose downstream outlet 25 is eccentric relative to the axial pivot 22.

The axial recess 24 faces an axial electrode 26 of the electrode carrier 14 This electrode carrier 14 is comprised by an electrode-carrying head 27, in which is inserted the electrode 26, screwed on the body of the tubular cartridge 28, incorporating a tubular insert 29, which has a bearing portion 30 for its securement in the body of cartridge 28, so as to form an internal conduit 31, opening at a flared downstream end 32 facing and at a small distance from a massive radial deflector 33 of the electrode head 27, the conduit continuing in an external annular conduit 34 between the electrode carrier 27 and a cartridge body 28 on the one hand and tubular insert 29 on the other hand, to open outwardly of the cartridge 14 through an annular plurality of radial holes 35, emptying into the interstitial space 36 between electrode-carrying cartridge 14 on the one hand and flared end 12 of shaft 7, casing 15 and nozzle 19 on the other hand, to terminate finally in the eccentric conduit 23.

At its upstream end, the internal conduit 31 of the tubular insert 29 opens into the tubular locking finger 13 which is in prolongation of an axial bore 37 of the shaft 7, which itself communicates, by a radial bore 38 through the shaft 7 and the spacer 10, with an annular chamber 39 communicating through a radial passage 40 with a connection 41 for a tube 42 for plasmagenic gas supply preferably disposed in the handle 2, which also incorporates an electric current feed wire 43 for the formation of the plasma, while the electric motor 5 is here fed by a separate cable 44.

In operation, the cutting out gun held in the hand by the handle 2 is placed in normal bearing by its pivot point 22 in the vicinity of a spot weld between two pieces of sheet metal. This bearing effects the passage of current between electrode 26, nozzle 19 and the sheets connected to the mass, while the motor 5 effects rotation of the mobile assembly 14-19 about the axial pivot 22. After a short lapse of time which permits gaseous flow, the operator relaxes somewhat the axial pressure, which has the effect of separating axially by a small distance the electrode-carrying cartridge 14 from the nozzle 19, thereby to create an arc between the electrode 26 and the nozzle 19 thereby forming an arc plasma which flows through the eccentric conduit 23, while the nozzle 19 comes into rotatable bearing via its shoulder 20 with the drivingly-rotated casing 17 thereby effecting in one rotation a cutting of the sheet about the pivot 22.

In exemplary embodiments, the energy which feeds the rotation drive member of the cartridge assembly could be one or the other of the two following types:

Electrical Energy

The electrical energy used could be that of the available outlets or else an autonomous energy source from batteries or rechargeable accumulators disposed in the cutting gun.

The actuator is thus a reduction motor of variable speed whose supply can be either independent: it is then connected to the electric supply outlet of the shop; or connected directly to the primary of a welding transformer or generator; or fed by the voltage of the cutting arc (in this case, the rotation of the cartridge does not start until after striking the arc).

Pneumatic Energy

The motor drive is then a pneumatic turbine or a mechanical device which transforms linear movement generated for example by a jack, into movement of rotation (helicoidal ramp). The feed could be either independent, connected to the compressed air circuit of the shop, or connected, in the generator, upstream or downstream of the gas electrovalve.

The mechanical assembly which permits the rotation of the electrode-bearing cartridge and of the nozzle could be effected in two different ways, in that the assembly is supported by two ball bearings, or the assembly could be guided by self-lubricating journal bearings.

The field of use of the tool as described is largely for the separation of sheet metal members, for example the repair of automobile bodies, or it can be used for unbuttoning the sheet metal of bodies to be replaced and more generally in all industries which assemble thin or medium thickness sheets by spot welding.

This tool could also be used in the field of fabrication, because it is possible to cut out circular shapes of various diameters from sheet metal. The cartridge as well as the parameters "speed of rotation" and "cutting intensity" are adapted to the thickness to be cut out. This use involves any industry of metal working or iron working.

I claim:

1. A plasma cutting torch comprising a body having a main axis and supporting, at one end, a cutting head including a cutting nozzle, having one end forming a plasma passage having an outlet for ejecting a plasma jet, and an electrode assembly extending into the cutting nozzle, said cutting head is rotatably mounted in the body for rotation about the axis and is connected to rotational driving means carried by the body, said driving means housed in the body and adapted to rotate said cutting head relative to said body, and the outlet of the plasma passage is eccentric relative to the axis, whereby by driving in rotation the cutting head, the plasma jet describes a circle coaxial to the axis for achieving a circular cut in a metal workpiece.

2. The torch of claim 1, further comprising a handle connected to the body for handling and manipulating the torch.

3. The torch of claim 2, wherein said one end of the cutting nozzle is provided with an external pivot bearing end coaxial with the axis for bearing contact engagement with a metal piece to be circularly cut.

4. The torch of claim 3, wherein the cutting head is mounted at one end of a shaft rotatable within the body.

5. The torch of claim 4, wherein the cutting nozzle is axially slidably mounted relative to the electrode assembly.

6. The torch of claim 4, wherein the shaft comprises an axial bore communicating by at least one radial bore, with an annular chamber formed in the body and into which empties a plasmagenic gas supply conduit.

7. The torch of claim 4, wherein the cutting nozzle is slidably mounted in a casing secured to the shaft and forming a conduit for plasmagenic gas.

8. The torch of claim 7, wherein the cutting nozzle comprises a small end collar coacting with an internal shoulder of the casing.

9. The torch of claim 1, wherein the rotational driving means comprise an electric motor.

* * * * *